April 18, 1950 C. O. BRUESTLE 2,504,177
CENTRIFUGAL CLUTCH
Filed Jan. 27, 1947 2 Sheets-Sheet 1
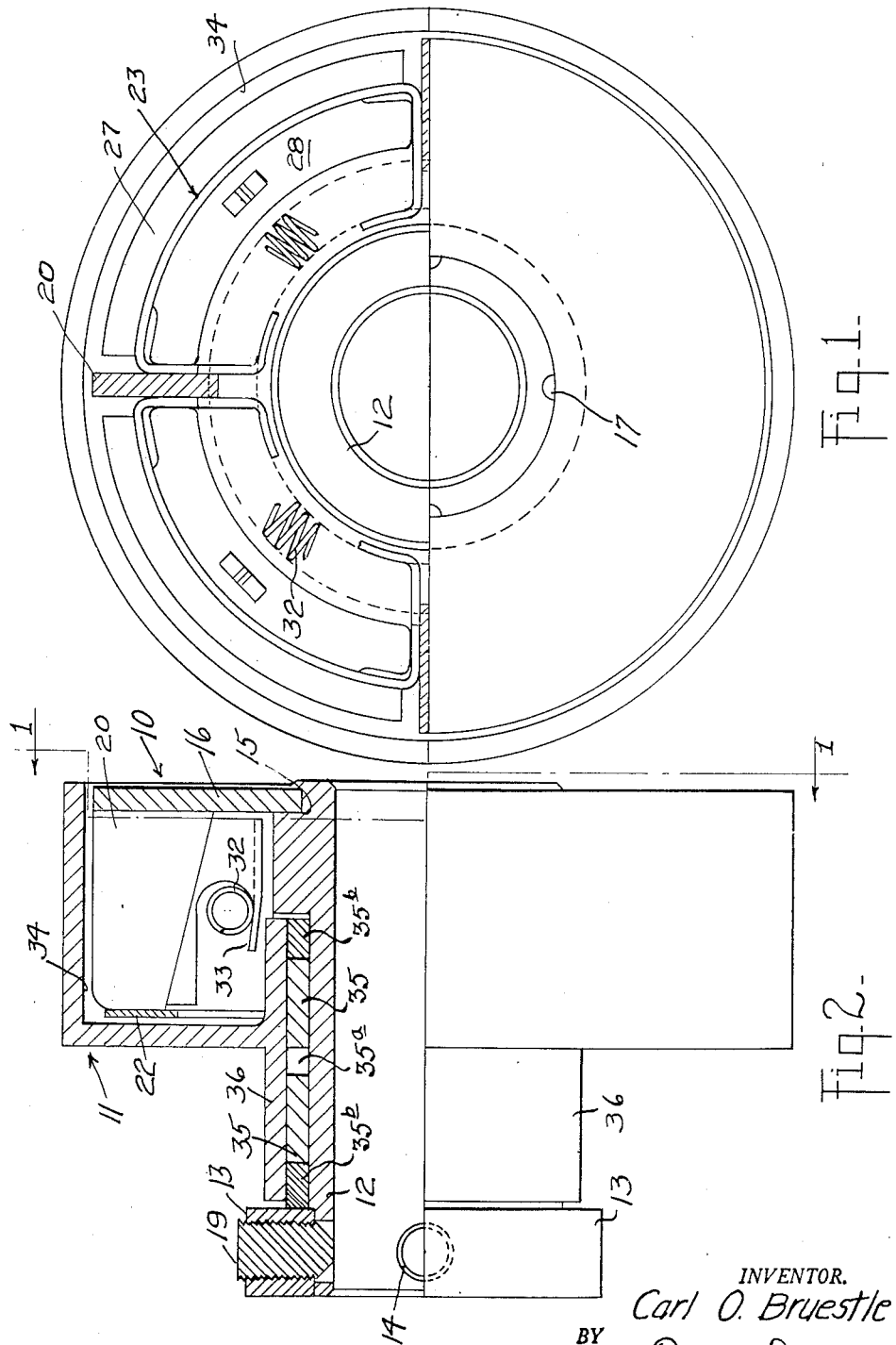
INVENTOR.
Carl O. Bruestle
BY Daly + Daly
ATTORNEYS April 18, 1950 C. O. BRUESTLE 2,504,177
CENTRIFUGAL CLUTCH
Filed Jan. 27, 1947 2 Sheets-Sheet 2
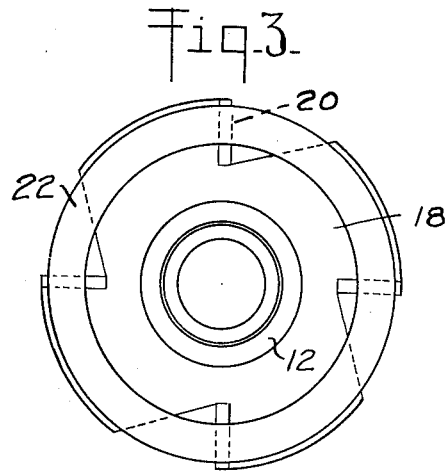
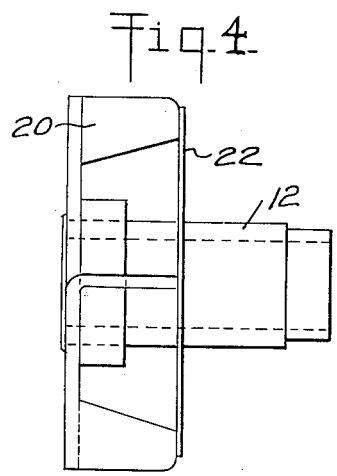
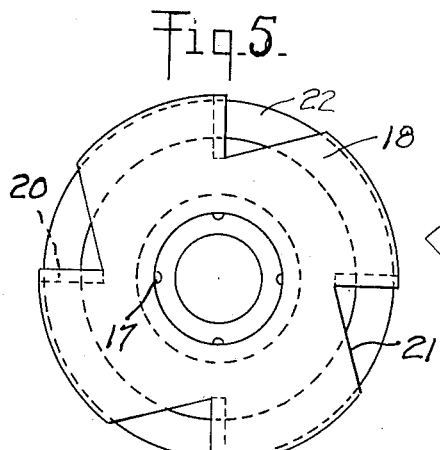
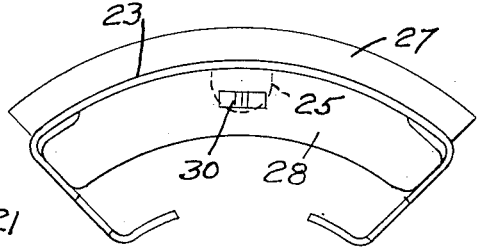
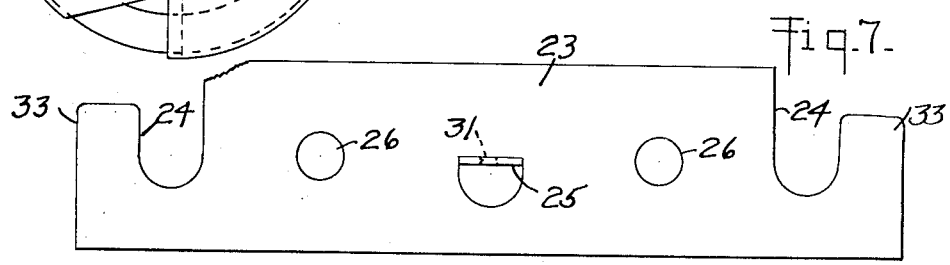
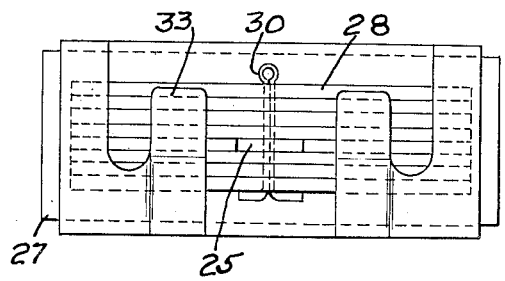
INVENTOR.
Carl O. Bruestle
BY Darby + Darby
ATTORNEYS Patented Apr. 18, 1950

2,504,177

UNITED STATES PATENT OFFICE 2,504,177

CENTRIFUGAL CLUTCH

Carl O. Bruestle, Rahway, N. J., assignor, by mesne assignments, to Centric Clutch Company, Cranford, N. J., a corporation of New Jersey Application January 27, 1947, Serial No. 724,651

6 Claims. (Cl. 192—105)

1

The present invention relates to clutches, and particularly to a centrifugal clutch. More particularly still, the invention pertains to a centrifugal clutch which is so arranged as to have a very gradual engaging action and likewise so arranged as to render the centrifugal force exerted capable of adjustment. Additionally, a clutch of the present invention may be very cheaply manufactured, since the parts thereof are in the main made by stamping operations.

It is an object of the present invention, therefore, to provide a centrifugal clutch having a very gradual engaging movement.

It is another object of the invention to provide a centrifugal clutch in which the number or size of the weights may be varied in order that the amount of centrifugal force exerted may likewise be varied.

It is a further object of the invention to make a clutch of the type described in which the parts are stampings and, consequently, may be very simply and economically manufactured.

It is a still further object of the invention to provide a centrifugal clutch which may be very readily and economically assembled.

Other objects and features of the invention will be apparent when the following description is considered in connection with the annexed drawings, in which:

Fig. 1 is a vertical view of the clutch of my invention taken on the plane of the line 1—1 of Fig. 2, showing the upper half of the clutch in section and the lower half in elevation;

Fig. 2 is a vertical longitudinal view of the clutch of my invention, the upper half again being in cross-section and the lower in elevation;

Fig. 3 is an end elevation of a portion of the driving element of the clutch of my invention;

Fig. 4 is a side elevation of the driving element of Fig. 3;

Fig. 5 is an end elevation of the driving element of Fig. 3 taken from the end opposite that from which Fig. 3 was taken;

Fig. 6 is a detail view showing the construction of one of the centrifugally-operated engaging elements;

Fig. 7 is a developed view of the centrifugally-operated member illustrating particularly the conformation of the member and the means for supporting certain weights thereon; and Fig. 8 is a view of the mechanism of Fig. 6 taken from the bottom thereof and illustrating the appearance of the centrifugally-engaging member or element when completely assembled.

2

Referring now to the drawings, and particularly to Figs. 1 and 2, the clutch comprises a driving member, generally designated 10, and a driven member, generally designated 11. The driving member 10 comprises a sleeve 12 adapted to be mounted on a driving shaft (not shown) and having a collar 13 affixed thereto in any suitable manner, as, for example, by means of the set-screw 14. The collar 13 is also provided with a set-screw 19 which extends through the sleeve 12 and bears against the shaft. Sleeve 12 at its opposite end is provided with a shoulder 15, and a rotor member 16 is mounted on the shoulder 15 and fixed in position in any suitable manner, as, for example, by staking, as is indicated at 17 in Fig. 1.

The rotor member 16, as may be clearly seen by reference to Figs. 3, 4, and 5, comprises a disk 18 from which vanes 20 are bent off—the disk, of course, being cut along the lines 21 in order to make this possible. The vanes 20 extend to the right, as seen in Fig. 4, and are joined by an annular ring 22 which is suitably fastened to the free ends of the vanes, for example, by welding.

In the instance shown, the rotor is provided with four vanes 20 and, correspondingly, there are provided four centrifugally-operating elements of the type now to be described.

Each centrifugally-operating element 23, prior to bending into final form, is of the shape shown in Fig. 7; that is, it comprises a rectangular piece of metal provided with the slots 24, one adjacent either end thereof, and a bent-up tab 25 at the center. In addition, the member 23 is provided with two holes 26 which, as will hereinafter appear, are utilized for the purpose of passing rivets therethrough.

The rectangular sheet of metal 23 is bent into the form shown in Fig. 7 and has fastened thereto in any suitable manner—as, for example, by means of rivets extending through the holes 26—an arcuate friction shoe 27 which engages the driven member, as will shortly appear.

In order that the amount of centrifugal force exerted by the centrifugal elements may be adjusted, weights 28 are provided, these weights being arcuate in shape and each being provided with a central hole. As is clearly seen in Figs. 6 and 8, these weights are shaped to conform to the arcuate shape of the members 23 and are held in position by a cotter pin 30 which extends also through a hole 31 in the bent-off tab or lug 25 of member 23.

The slots or notches 24 in the members 23 lie adjacent the lowermost bends in members 23, as seen in Figs. 6, and thus an endless spring 32 may extend through the notches 24 and be supported upon the ends of members 23. In order that the spring member may be retained in its position, the corners 33 of members 23 extending beyond the slots 24 are bent upwardly (see Fig. 2).

In operation, the member 16 is driven and the vanes 20 thereof bear against and drive the members 23. As the speed of the driving member 10 increases, centrifugal force proportionate to the weights 28 is exerted and the entire centrifugally-operating members, comprising the arcuate band 23 with the weights 28 and the friction shoe 27, moves outwardly, overcoming the tension of the spring 32 at a certain speed—depending, of course, upon the strength of the spring 32 as well as upon the entire mass of the weights 28. The shoes 27 come into contact with the inner annular surface 34 of the cup-shaped driven member 11. This driven member is rotatable on the sleeve 12, the member 11 being provided with a hub 36 in which is secured the bushing 35 as by a press fit, for example. Thus, at a speed which may be adjusted by means of varying the number of weights 28, the driving member engages the driven member; further, the engaging action is gradual, since the centrifugal force exerted by the weights has to overcome the tension of the spring 32.

As will be seen, the centrifugal clutch of the instant invention is made substantially entirely from stamped metal parts and, thus, is very readily and economically manufactured. The parts, furthermore, are so arranged as to make it very easy to assemble the clutch and very easy to vary the number of weights in each group or to vary the spring utilized, or both. Thus, in order to change the number of weights or to change the spring, it is only necessary to loosen the set-screws 14 and 19 and remove the collar 13 from the sleeve 12. This frees the hub 36 so that housing 11 may be slipped from the sleeve 12 and thus expose the circumference of the driving member 10. The centrifugally-operated elements may then be removed by lifting them radially outwardly and weights added or taken away. If necessary, the spring 32 may be temporarily removed from the notches 24 in order to make it possible to remove the centrifugally-operated elements.

Another important feature herein disclosed of special value in a device of this type but generally valuable for other applications is present in the sealed bearing structure disclosed. As illustrated in Figure 2, the bearing bushing 35 is divided into two parts as shown, longitudinally spaced to provide a pocket or recess 35ª. At the ends of the bearings are a pair of rings 35ᵇ which have a clearance fit with the sleeve 12 and a forced fit with the sleeve 36. This construction provides a bearing which is substantially perfectly sealed against leakage due to centrifugal forces. If an ordinary bearing were used lubricant would escape into the housing part of the driven member 11 and be thrown into contact with the inner annular friction surface 34 of the housing. Of course, the presence of oil at this point will greatly reduce the efficiency of power transmission because of the tendency of the friction shoes to slip.

As clutches of this type are commonly used at fairly high rotative speeds a very serious problem is presented in preventing escape of oil at the ends of the sleeve 36. The arrangement disclosed has been found very effective in preventing oil leakage from this bearing. Under the rotative forces encountered the lubricant works under centrifugal force radially outwardly until it encounters the inner annular surface of the sleeve 36. For example, if the bearings 35 are of the porous type commonly used today the oil will gradually work through them to the sleeve 36. In its effort to escape it will tend to work axially in both directions, but if it moves outwardly from the center, that is towards the rings 35ᵇ, it encounters a sealed leakproof joint at the surfaces of the forced fit between the sleeve 36 and the rings 35ᵇ. The lubricant pressure which builds up is therefore relieved by the oil traveling towards and into the recess or pocket 35ª where it collects. Little, if any, oil will escape through the clearance between the inner annular surface of the sealing rings 35ᵇ and the sleeve 12 because, as previously stated, centrifugal force moves the oil to the inner face of sleeve 36. This arrangement has been found very effective for the purpose explained. When the device is at rest any oil which is collected in the pocket 35ª gradually returns by capillary attraction to a more or less even distribution over the bearing surfaces, and if the bearing bushings 35 are of the porous type it will gradually be absorbed by them.

While I have described a preferred embodiment of my invention, it will be obvious to those skilled in the art that other modifications may be used and, therefore, I do not wish to be restricted to the particular device shown and described, but only within the scope of the appended claims.

What is claimed is:

1. In a centrifugal clutch of the type described, in combination, a rotatable driving member having a disk fastened thereto and a plurality of vanes fixed to said disk and extending axially of said driving member, a plurality of arcuate centrifugally-operated members each comprising a wide band bent to the shape of a circle arc and having radially-extending depending sides, arcuately-extending flanges bent off from said sides, a lug bent off from the arcuate portion of said band, means for mounting weights on said lug, slots in the edges of said sides adjacent the juncture of said flanges, each said centrifugally-operated member being mounted between a pair of said vanes and capable of radial movement, a spring extending circumferentially of said driving member, said spring extending through said slots in the side edges of said bands to thereby urge said centrifugally-operated means radially inward, a driven member comprising a drum mounted concentrically of said driving member, and friction shoes mounted on the peripheries of the outer arcuate portion of said band, said shoes being adapted to engage the inner surface of said drum upon the driving member attaining a predetermined rotational speed.

2. In a centrifugal clutch of the type described, in combination, a rotatable driving member having a disk fastened thereto and a plurality of vanes fixed to said disk and extending axially of said driving member, a plurality of arcuate centrifugally-operated members each comprising a wide band bent to the shape of a circle arc and having radially-extending depending sides, arcuately-extending flanges bent off from said sides, a lug bent off from the arcuate portion of said band, means for mounting weights on said lug, slots in the edges of said sides adjacent the juncture of said flanges, a bend at each flange near the base of the associated slot, each said centrifugally-operated member being mounted between a pair of said vanes and capable of radial movement, a spring extending circumferentially of said driving member, said spring extending through said slots in the side edges of said band and being held in position by said bent edges of said flanges to thereby urge said centrifugally-operated means radially inward, a driven member comprising a drum mounted concentrically of said driving member, and friction shoes mounted on the peripheries of the outer arcuate portion of said band, said shoes being adapted to engage the inner surface of said drum upon the driving member attaining a predetermined rotational speed, said spring determining the rate at which engagement occurs.

3. In a driving member for a centrifugal clutch of the type described, in combination, a sleeve adapted to be fixed to a drive shaft, a disk mounted on said sleeve at one end thereof, a plurality of vanes bent from said disk at right angles thereto and extending axially of said sleeve, an annular ring fixed to the free ends of said vanes, and a plurality of centrifugally-operated members each comprising a generally-rectangular metallic band having the corners removed from a pair of opposite sides and having slots extending inwardly from one edge adjacent the corner cuts, said band having a central section bent to arcuate shape and having two side sections extending radially inwardly from the bends, each said side section being bent adjacent the inner edges of said slots to form flanges and said flanges having the free ends thereof bent slightly upward, each said centrifugally-operated member being mounted with its sides in contact with said vanes and being confined between said disk and said annular ring, said centrifugally-operated members being movable radially of said disk.

4. In a driving member for a centrifugal clutch of the type described, in combination, a sleeve adapted to be fixed to a drive shaft, a disk mounted on said sleeve at one end thereof, a plurality of vanes bent from said disk at right angles thereto and extending axially of said sleeve, an annular ring fixed to the free ends of said vanes, a plurality of centrifugally-operated members each comprising a generally-rectangular metallic band having the corners removed from a pair of opposite sides and having slots extending inwardly from one edge adjacent the corner cuts, said band having a central section bent to arcuate shape and having two side sections extending radially inwardly from the bends, each said side section being bent adjacent the inner edges of said slots to form flanges and said flanges having the free ends thereof bent slightly upward, each said centrifugally-operated member being mounted with its sides in contact with said vanes and being confined between said disk and said annular ring, said centrifugally-operated members being movable radially of said disk, and an endless coil spring extending through the slots of said metallic bands and resting on said flanges, said spring urging said centrifugally-operated members radially inward.

5. In a driving member for a centrifugal clutch of the type described, in combination, a sleeve adapted to be fixed to a drive shaft, a disk mounted on said sleeve at one end thereof, a plurality of vanes bent from said disk at right angles thereto and extending axially of said sleeve, an annular ring fixed to the free ends of said vanes, a plurality of centrifugally-operated members each comprising a generally-rectangular metallic band having the corners removed from a pair of opposite sides and having slots extending inwardly from one edge adjacent the corner cuts, said band having a central section bent to arcuate shape and having two side sections extending radially inwardly from the bends, each said side section being bent adjacent the inner edges of said slots to form flanges and said flanges having the free ends thereof bent slightly upward, each said centrifugally-operated member being mounted with its sides in contact with said vanes and being confined between said disk and said annular ring, said centrifugally-operated members being movable radially of said disk, a lug bent off the central arcuate section of said band, said lug having a hole therethrough, weights of arcuate shape adapted to be positioned within the hollow body formed by said bent band, and means for fastening said weights to said lug.

6. In a driving member for a centrifugal clutch of the type described, in combination, a sleeve adapted to be fixed to a drive shaft, a disk mounted on said sleeve at one end thereof, a plurality of vanes bent from said disk at right angles thereto and extending axially of said sleeve, an annular ring fixed to the free ends of said vanes, a plurality of centrifugally-operated members each comprising a generally-rectangular metallic band having the corners removed from a pair of opposite sides and having slots extending inwardly from one edge adjacent the corner cuts, said band having a central section bent to arcuate shape and having two side sections extending radially inwardly from the bends, each said side section being bent adjacent the inner edges of said slots to form flanges and said flanges having the free ends thereof bent slightly upward, each said centrifugally-operated member being mounted with its sides in contact with said vanes and being confined between said disk and said annular ring, said centrifugally-operated members being movable radially of said disk, an endless coil spring extending through the slots of said metallic bands and resting on said flanges, said spring urging said centrifugally-operated members radially inward, and shoes of friction material mounted on the central arcuate section of said band.

CARL O. BRUESTLE.

REFERENCES CITED

The following references are of record in the file of this patent:

UNITED STATES PATENTS

| Number | Name | Date |
|---|---|---|
| 34,012 | Reynolds | Dec. 24, 1861 |
| 775,757 | Loria | Nov. 22, 1904 |
| 1,072,189 | Sparks | Sept. 2, 1913 |
| 1,714,748 | Wright | May 28, 1929 |
| 1,866,291 | Bryson | July 5, 1932 |
| 1,988,922 | Stephenson | Jan. 22, 1935 |
| 2,000,713 | Norris | May 7, 1935 |
| 2,024,677 | Bosma | Dec. 17, 1935 |
| 2,259,648 | Lucas | Oct. 21, 1941 |
| 2,455,086 | Papas | Nov. 30, 1948 |

FOREIGN PATENTS

| Number | Country | Date |
|---|---|---|
| 208,863 | Great Britain | Jan. 3, 1924 |
| 219,884 | Great Britain | Aug. 7, 1924 |
| 490,605 | Great Britain | Aug. 17, 1938 |
| 577,492 | Great Britain | May 21, 1946 |